United States Patent [19]

Goshorn et al.

[11] Patent Number: 4,799,458
[45] Date of Patent: Jan. 24, 1989

[54] ANIMAL RESTRAINT COLLAR

[76] Inventors: Jean Goshorn; L. David Loucks; Terry K. Loucks, all of 7604 Wheatland, Sun Valley, Calif. 91352

[21] Appl. No.: 93,753

[22] Filed: Sep. 8, 1987

[51] Int. Cl.$^4$ ............................................. A01K 29/00
[52] U.S. Cl. .................................................... 119/96
[58] Field of Search ................. 119/96, 101, 126, 127, 119/128; 128/133, 134, 76 R, 78; 54/71

[56] References Cited

U.S. PATENT DOCUMENTS

| | | | |
|---|---|---|---|
| 30,601 | 11/1860 | Wright | 128/78 |
| 443,764 | 12/1890 | Hilliard | 128/78 |
| 1,301,276 | 4/1919 | Kroetz | 128/78 |
| 2,595,302 | 5/1952 | Sanders | 119/126 |
| 2,704,428 | 3/1955 | Sessler | 119/96 |
| 2,796,866 | 6/1957 | Cohen | 128/78 |
| 3,994,264 | 11/1976 | Flynt | 119/96 |
| 4,286,547 | 9/1981 | Newbauer et al. | 119/96 |

FOREIGN PATENT DOCUMENTS 203771  11/1908  Fed. Rep. of Germany ...... 119/126

Primary Examiner—Robert P. Swiatek
Assistant Examiner—R. Thomas Price
Attorney, Agent, or Firm—Roger A. Marrs

[57] ABSTRACT

A collar device is disclosed herein for restricting the movement of an animal's head which comprises a buckled band of sufficient width to occupy a neck region of the animal substantially between the shoulder and the base of the head. A rigid head frame cantilevers from the band about each side of the animal's head while an adjustable crosspiece connects the pair of side members forming the frame. A torso strap is displayed about the chest of the animal and connection straps join the strap to the neckband on each side of the animal.

1 Claim, 1 Drawing Sheet

ANIMAL RESTRAINT COLLAR

BACKGROUND OF THE INVENTION

1. Field of the Invention

The present invention relates to animal restraint devices and, more particularly, to a head restraining device adapted to be worn about the neck and torso of an animal with a rigid head frame intended to prevent the animal's head from turning rearward

2. Brief Description of the Prior Art

In the past, it has been the conventional practice to employ a thick collar intended to prevent the animal's head from turning rearwardly so as to avoid the animal biting or nipping at operational stitches, hot spots, skin rashes or the like. It is the nature of an animal to want to lick or remove items such as stitches, bandages, or the like from the back, stomach or hindquarters. Obviously, such action would undo any medical procedures that were performed on the animal.

Some attempts have been made to provide devices which are worn about the neck of the animal so as to restrict or prevent the turning of the animal's head. Such devices generally take the form of a conically shaped, thin plastic member which when strapped about the animal's neck radiates outwardly and extends beyond the normal contour of the animal's body. Problems and difficulties have been encountered when using such a device which stem largely from the fact that due to the extreme size of the device, walking by the animal is greatly restricted and many times the animal's ability to eat from bowl or dish is restricted. Furthermore, should the animal run or walk, the animal's gait is extremely awkward and passage through narrow walkways or access doors is greatly restricted. Such prior collars generally interfere with such passageways and doors so that the animal is sometimes injured when attempting to traverse such an area. In other instances, the thin edge of the plastic has a tendency to cut or bear into the skin of the animal which, again, causes irritation and injury.

When thickened collars are used, hook and pile fasteners usually join the opposite ends in a tight closure. However, the animal may still have the ability to peel the closure members apart to remove the collar.

Therefore, a long-standing need has existed to provide a suitable head restraining device to be worn about the neck, head and chest of the animal which will not restrict his normal activities but will prevent extreme rearward disposition of the animal's head with respect to his body.

SUMMARY OF THE INVENTION

Accordingly, the above problems and difficulties are obviated by the present invention which provides a wide neckband placed about the neck of the animal having a rigid frame projecting forwardly about each side of the animal's head with a braced crosspiece joining the other frame sides. Adjustment means provide accommodation of the frame to various head sizes. A torso strap extends about the chest of the animal immediately behind the front legs and connecting straps join the neckband with the torso strap. Buckle fasteners removably maintain the neckband, torso strap and connecting straps together.

Therefore, it is among the primary objects of the present invention to provide a novel restraint collar for an animal which will readily and effectively prevent the animal's head from turning rearwardly without interfering with the animal's walking or feeding habits and which will not prevent passage through doors or passageways normally accommodating the body of the animal.

Yet another object of the present invention is to provide a novel restraint collar which is inexpensive to manufacture and which may readily be fastened about the neck of an animal by a person not having skill.

A further object is to provide a novel closure means for a restraint collar which cannot be opened or dislodged by an animal while the animal is wearing the collar on his neck.

Yet another object of the invention resides in a novel animal head restraint having a rigid frame adjustable about the head of the animal and which includes a pair of connected neck and body straps that stabilizes the frame about the animal's head as the animal normally moves.

Still a further object resides in the provision of adjustment means for fitting a rigid head restraint about the head of an animal so as to accommodate animals of various sizes and builds.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

Figure 1:
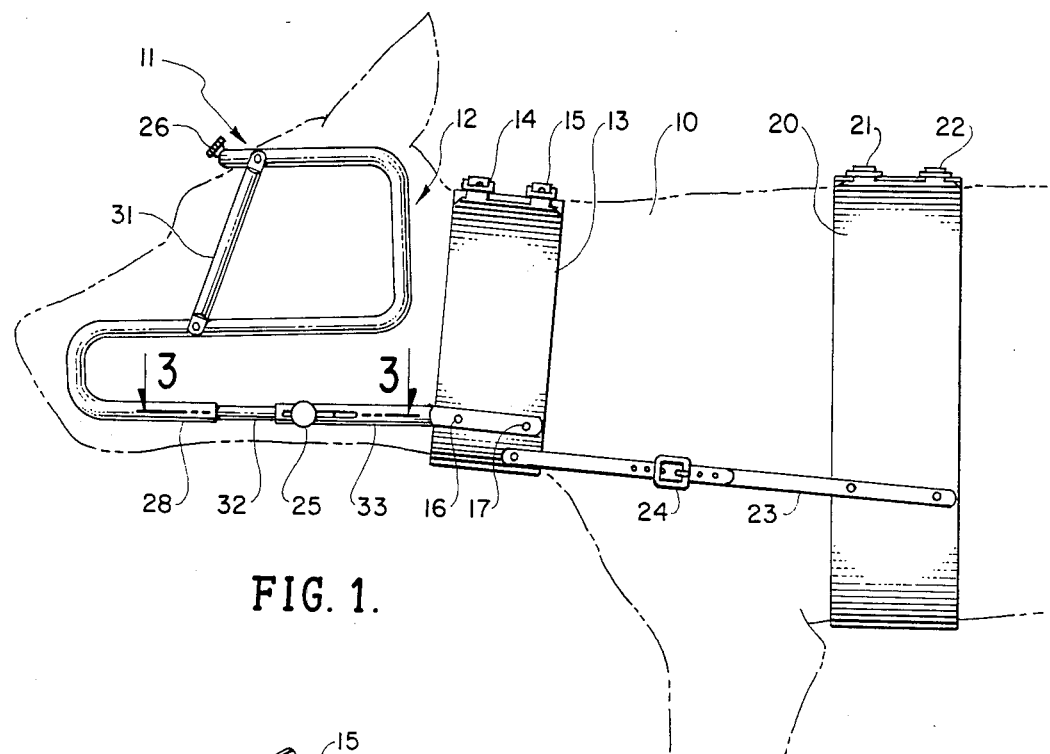
FIG. 1 is a side elevational view showing the novel animal head restraint incorporating the present invention.

Referring to FIG. 1, an animal is represented by the numeral 10 and the head restraint for the animal is indicated in the general direction of arrow 11. The head restraint includes a rigid frame generally indicated by numeral 12 which is adjustably placed about the head of the animal while a neckband 13 is placed about the neck of the animal and retained thereon by means of a pair of buckles 14 and 15. The frame 12 is securely attached to the neckband 13 by means of rivets or other fasteners as indicated by numerals 16 and 17 respectively. Futher support and stabilization for the rigid head frame is achieved by use of a torso strap 20 which is buckled about the body of the animal and retained in position by a pair of buckles 21 and 22 respectively. The neckband 13 is joined to the body strap 20 by means of a pair of connecting straps such as strap 23 which is made adjustable by incorporation of a buckle 24. It is important to note that the buckles 14, 15 and buckles 21, 22 as well as buckle 24 are of identical construction and that the animal cannot inadvertently unbuckle such fasteners as may be the case when hook and pile fasteners are used. The buckle fasteners are also evident of the fact that the band 13, strap 20 and the connecting straps 23 may be adjusted to the size, shape or build of the animal about which the apparatus is being placed. Further adjustment is provided for the rigid frame 12 by means of telescoping adjustment means identified by numerals 25 for the lower part of frame 12 and numeral 26 for adjusting across the brow or width of the animal's head.

Figure 2:
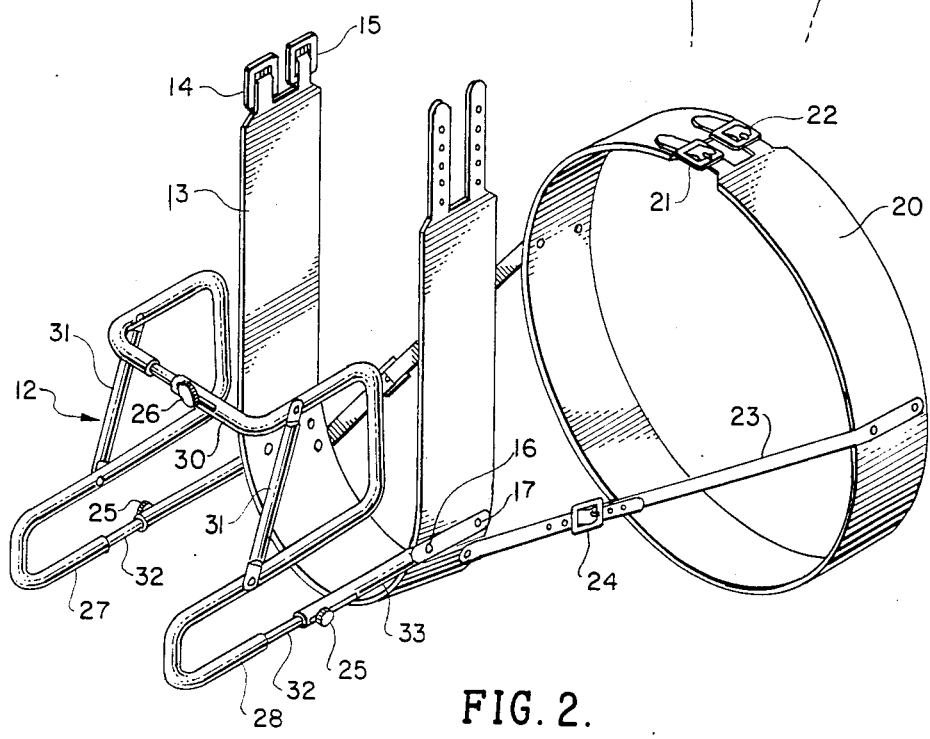
FIG. 2 is a front perspective view of the novel animal head restraint shown in FIG. 1.

Referring now in detail to FIG. 2, it can be seen that the rigid frame 12 includes a pair of spaced apart side members indicated by numerals 27 and 28 which run parallel to the jaw of the animal and which are configured to make a 90° upward turn where an additional 90° backward turn is provided adjacent to the section of the head right behind the ears. At this juncture, another 90° upward turn is taken behind the ears with still another 90° turn forward over the eyes. The turn over the brow or eyes is identified by numeral 30 and includes the telescoping adjustment 26. It is obvious that the rigid side sections or members 27 or 28 are identical and that the sections or members reside on opposite sides of the animal's head. An angular brace 31 is associated with each side of the rigid frame which supports and stabilizes the rigidity of the frame.

The neckband 13 is preferably of leather construction and is intended to encircle the animal's neck. The purpose of the band is to secure the rigid metal frame 12 in position about the animal's head and to limit the mobility of the animal's head. The body band or strap 20 increases the capability of the device to immobilize the animal's head at the rearmost of the animal's body.

Figure 3:
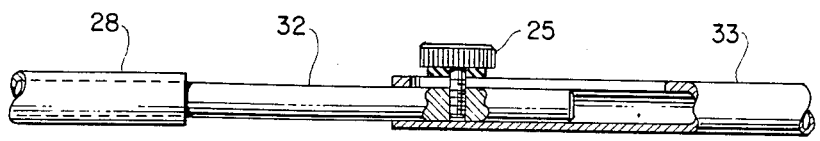
FIG. 3 is an enlarged sectional view showing the adjustment means used in connection with the head frame.

Referring now in detail to FIG. 3, an enlarged view is shown of the adjustment means wherein adjustment means 25 is represented. The side member of the rigid frame such as side member 28, includes a rod 32 that is inserted into the interior of a tube 33 and a screw fastener 25 serves as a clamp to hold the rod in position. In other instances, holes may be placed through the rod 32 which when registered with the threaded shank of the screw will hold the rod in position with respect to the tube 33. Other means of adjustment may be employed without departing from the inventive concept.

Therefore, it can be seen that the head restraint apparatus of the present invention immobilizes the animal's head and prevents the animal from chewing, biting, licking or otherwise disrupting medical and surgical procedures which have been applied to areas of the body behind the shoulders, chest or torso. At the same time, the animal is able to normally eat, walk or run and the apparatus does not impede his mobility or ability to perform normal functions. It is also to be particularly pointed out that the rigid head frame 12 is not to be considered a muzzle and n no manner, shape or form does the rigid frame restrict the animal from opening or closing his mouth. The bands and straps 13 and 20 respectively serve to rigidly and support the frame 12 and adjustment for size, shape and build of the animal is achieved through the adjustment means 25, 26 as well as the various buckle arrangements for the straps and band.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An animal head restraint comprising:

a neckband of sufficient width to substantially occupy the neck area of the animal's body;

a rigid head frame secured to said neckband having a front portion projected forwardly in a cantilevered deployment, opposite side portions extending about the opposite sides of the head and a cross portion extending across the forehead of the head having its opposite ends secured to said side portions respectively so as to define an open and unrestricted frontal area to accommodate the jaws and mouth of the animal;

a torso strap retained about the body of the animal in spaced apart relationship with respect to said neckstrap;

connection means joining said torso strap and said neckstrap together;

adjustment means carried on said head frame cross portion said side portions for transversely widening said frame and longitudinally lengthening said frame;

said side portions being a pair of tubular longitudinally adjustable side member joined together by said transversely adjustable cross portion;

brace means carried on each side member to reinforce, stabilize and maintain rigidity of said frame;

buckle means detachably joining opposing ends of said neckband together, detachably joining opposing ends of said torso strap together and detachably coupling said connection means together; and said neckband and said strap being of semi-rigid composition.

* * * * *